United States Patent
Glas et al.

(10) Patent No.: US 6,430,151 B1
(45) Date of Patent: Aug. 6, 2002

(54) LOCAL NETWORK WITH REDUNDANCY PROPERTIES HAVING A REDUNDANCY MANAGER

(75) Inventors: Karl Glas, Herzogenaurach; Joachim Lohmeyer, Hilpoltstein; Rolf Reuschen, Neuffen; Bernhard Schmid, Ebersbach, all of (DE)

(73) Assignees: Siemens Aktiengesellschaft, Munich; Richard Hirschmann GmbH & Co., Neckardenzlingen, both of (DE)

( * ) Notice: Subject to any disclaimer, the term of this patent is extended or adjusted under 35 U.S.C. 154(b) by 64 days.

(21) Appl. No.: 09/659,848

(22) Filed: Sep. 11, 2000

Related U.S. Application Data

(63) Continuation of application No. PCT/EP99/01125, filed on Feb. 22, 1999.

(30) Foreign Application Priority Data

Mar. 11, 1998 (DE) .......................... 198 10 587

(51) Int. Cl.[7] .......................... H04L 29/14; H04L 12/26; H04L 12/413
(52) U.S. Cl. .......................... 370/222; 370/245; 370/248; 714/717
(58) Field of Search .......................... 370/241, 242, 370/244, 245, 248, 252, 216, 217, 221, 222, 223, 224; 714/712, 714, 715, 716, 717

(56) References Cited

U.S. PATENT DOCUMENTS

| | | | | |
|---|---|---|---|---|
| 4,209,666 A | * | 6/1980 | Lawton | 370/222 |
| 4,354,267 A | | 10/1982 | Mori et al. | |
| 4,800,559 A | | 1/1989 | Florea et al. | |
| 5,317,198 A | * | 5/1994 | Husbands | 714/717 |
| 5,446,725 A | * | 8/1995 | Ishiwatari | 370/222 |
| 5,469,503 A | | 11/1995 | Butensky et al. | |
| 5,737,370 A | * | 4/1998 | Hetzel | 375/356 |
| 5,796,720 A | * | 8/1998 | Yoshida et al. | 370/245 |

FOREIGN PATENT DOCUMENTS

| | | |
|---|---|---|
| DE | 195 13 315 A1 | 10/1996 |
| DE | 195 13 316 A1 | 10/1996 |
| EP | 0 052 390 A | 5/1982 |
| EP | 0 403 763 A | 12/1990 |
| EP | 0 519 712 A | 12/1992 |
| EP | 0 688 121 A1 | 12/1995 |
| WO | WO 95/15641 A | 6/1995 |

* cited by examiner

Primary Examiner—Ricky Ngo
(74) Attorney, Agent, or Firm—Sughrue Mion, PLLC

(57) ABSTRACT

An Ethernet network with redundancy properties and an associated method for detecting and eliminating errors in the network. A redundancy manager (6), which is connected to the line ends of the network (1), checks the status of the network by transmitting and receiving test telegrams. If there is an interruption in the network, the redundancy manager (6) connects the line ends (7, 8) and thereby ensures continued network operation within milliseconds. The network has a loop structure that is less expensive than a dual bus structure even though fast media redundancy is ensured.

8 Claims, 1 Drawing Sheet

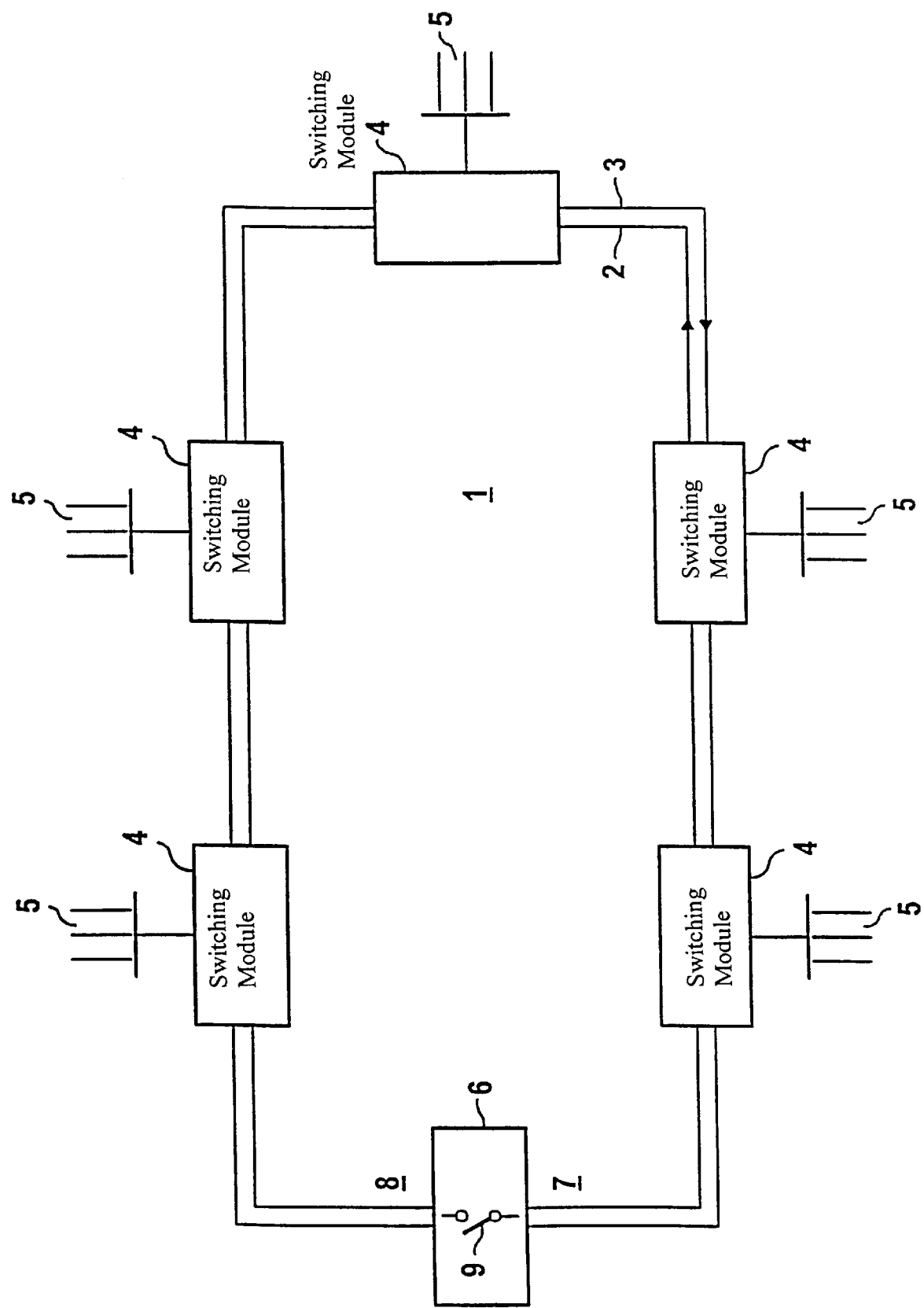

LOCAL NETWORK WITH REDUNDANCY PROPERTIES HAVING A REDUNDANCY MANAGER

This is a Continuation of International Application PCT/EP99/01125, with an international filing date of Feb. 22, 1999, the disclosure of which is incorporated into this application by reference.

FIELD OF AND BACKGROUND OF THE INVENTION

The invention relates to a local network having redundancy properties. More specifically, the invention relates to an Ethernet network having a redundancy manager.

Ethernet networks and their properties are known from German Laid Open Publication DE 19 513 316 A1, German Laid Open Publication DE 19 513 315 A1, European Laid Open Publication EP 688 121 A1, U.S. Pat. No. 5,469,503, PCT Publication WO 95 15 641 A1 and U.S. Pat. No. 4,800,559, for example. Generally, redundant communication in automation systems has previously been implemented by a dual structure of the entire automation systems. This dual structure includes subscribers and a network infrastructure (dual bus system).

European Patent EP 0 403 763 B1, the disclosure of which is incorporated into the present application by reference, teaches a linear Ethernet network, in which the two line ends of the network are connected to a redundancy manager. If there are no errors in the network, the redundancy manager separates the two line ends from each other. If errors do occur in the network, then the redundancy manager connects the two line ends together. The redundancy manager checks whether a transmitted data signal appears simultaneously at the two line ends within a predetermined period of time. Thus, the redundancy manager checks whether the linear network operates in an error-free manner.

However, in the error-free case, this testing criterion can only be applied in a linear network, in which transmitted data telegrams actually do appear at both line ends. This condition is fulfilled, for example, in a linear network that is structured with layer-1-components, i.e., with components that only carry out a regeneration or amplification of the telegrams but that do not carry out an address evaluation and a telegram routing. On the other hand, in a network with layer-2-components, e.g. bridges, which carry out telegram routing, i.e., analyze the target address and the source address of the telegrams and forward the telegrams according to their addresses to connected segments, a transmitted data signal does not necessarily simultaneously appear at both line ends, even in tile error-free case. Thus, this testing criterion is not always applicable in a linear network having layer-2-components.

European Patent Application EP 0 052 390 A1, the disclosure of which is incorporated into the present application by reference, teaches a network with redundant transmission lines, in which one of the transmission subscribers transmits, in a fixed time clock, test messages to the other subscribers. These test messages are transmitted in the form of test packets that are evaluated by a receiving circuit. If the test packets are error-free, a downstream evaluation logic generates a switching signal for the reception of signals from another bus line. If, however, errors did occur on a bus line, then the downstream evaluation logic generates a report signal to report this particular bus line.

Another possibility of media redundancy is provided by layer-2-components (bridge/switch) using the standardized spanning tree protocols (IEEE 802.1D). Since this protocol can handle network structures, which are interconnected in my desired way, it is relatively complex. Using the standard parameters in the spanning tree protocol, it takes roughly 30 to 60 seconds after occurrence or elimination of an error in the network until the network returns to a stable status, depending on the complexity of the network structure and the number of layer-2-components. By optimizing individual parameters, this time can be reduced. However, the minimum achievable reaction time is never shorter than some 5 seconds. This time interval, however, is unacceptable for automation systems, because, during this period of time, no productive communication can take place between the automation systems. In particular, the connected subscribers would dismantle logical connections. The process at hand would progress in uncoordinated manner. Alternatively, an emergency cutoff of the automation system would have to be carried out.

OBJECTS OF THE INVENTION

It is one object of the present invention to provide a fast media redundancy in a local network, particularly in an Ethernet network, and to provide a suitable redundancy manager. Fast media redundancy means that, after occurrence or elimination of an error, the network reconfigures itself into a functioning structure in less than a second. This is a critical time period for automation systems.

SUMMARY OF THE INVENTION

This and other objects of the invention are achieved by providing a local network having redundancy properties and by providing an associated redundancy manager and a method for detecting and eliminating errors in the network. The network includes a line, a redundancy manager, and switching modules, which are configured as layer-2-components. The line forms a line-shaped topology of the network and has two line ends. These two line ends are connected to the redundancy manager.

If there are no errors in the network, the redundancy manager separates the two line ends from each other. If there are errors in the network, then the redundancy manager connects the two line ends with each other.

The redundancy manager feeds, in first predetermined time intervals, at least one first test telegram into the two line ends. Thereafter, the redundancy manager derives a first command to separate the two line ends, if the first test telegram is received at a respective other one of the two line ends within a second predetermined time interval. If the first test telegram is not received within the second predetermined time interval, then the redundancy manager derives a second command to connect the two line ends.

The network topology includes a line having layer-2-components. The redundancy manager is preferably designed as a layer-2-component, which has special operating software to control the network structure and which is coupled to the two line ends of the network. As noted above, in the error-free case, the redundancy manager separates the two line ends from each other. If errors do occur, for example when a line is interrupted or a layer-2-component fails to operate, the redundancy manager connects the two line ends together. In this way, a functioning line is provided again. For a rapid, reliable error-detection in the network or for error-elimination, two mechanisms are used. These mechanisms are particularly advantageous if they are used in combination.

Error Detection Mechanism 1:

Each layer-2-component within the network detects failures of the data line or failures of an adjacent layer-2-component as well as the elimination of these errors with the mechanisms standardized in IEEE 802.3. After an error is detected, the layer-2-component sends a special "error occurred" telegram to the redundancy manager, in order to report the detected error. After an error is eliminated, the layer-2-component sends a special "error eliminated" telegram to the redundancy manager, in order to signal the change in the network structure.

Error detection mechanism 2:

In predetermined time intervals $T_1$, the redundancy manager feeds test telegrams into the two line ends. If the test telegrams are received at the respective other line ends, the redundancy manager generates a command to separate the two line ends. If the test telegrams are not received at the respective other line ends within a predetermined interval $T_2 = n \cdot T_1$, i.e., if the test telegrams on the line are lost, the redundancy manager recognizes an error in the network. If the $T_1$ and $T_2$ parameters are appropriately selected, the error detection takes place in a time interval that is considerably shorter than one second.

After connecting the line ends, i.e. after the occurrence of an error, or after separating the line ends, i.e., after elimination of an error, the redundancy manager sends a special "network topology change" telegram to the other layer-2-components to inform them of the change in the network topology. After this telegram is received, the layer-2-components delete dynamic entries in their address tables. These are structured according to the definition "address table/filtering database" in IEEE 802.1D, for example. In this way, it is ensured that, immediately after the reconfiguration of the network, all telegrams reach the subscribers again.

When errors occur or when errors are eliminated, the described mechanisms ensure a fast reconfiguration of the network into a functioning structure in substantially less than a second.

BRIEF DESCRIPTION OF THE DRAWINGS

The invention and further advantageous refinements of the invention according to the features of the dependent claims are explained in more detail below with the aid of a simplified, exemplary embodiment, illustrated in the single drawing, which shows an annular Ethernet network according to the invention.

DETAILED DESCRIPTION OF THE PREFERRED EMBODIMENTS

In one embodiment of the present invention, an annular Ethernet network 1 includes commercial components, such as a glass fiber cable having fibers 2 and 3 to transmit or receive telegrams. As an alternative, the Ethernet network could be structured with electrical components, such as a twisted pair cable with two pairs of conductors. Switching modules 4 are situated at predetermined distances, which may be e.g. several kilometers long, from one another. These switching modules are designed as layer-2-components, via which links 5 lead to further subscribers (not shown). These subscribers are automation systems, operating and observation stations, servers, printers, other networks etc. Two line ends 7 and 8 are connected to a redundancy manager 6 that monitors the network and reconfigures it, if necessary. The redundancy manager 6 operates like an intelligent switch 9.

If no errors occur in the network, the redundancy manager separates the two line ends 7 and 8 from each other. This corresponds to an open switch 9, If errors do occur in the network, then the redundancy manager connects the two line ends 7 and 8 together, i.e., the redundancy manager forwards all messages received at one line end 7 to the other line end 8 and vice versa. That corresponds to a closed switch 9. To control the switching procedure, the redundancy manager 6 feeds test telegrams at brief time intervals into the two line ends 7, 8 and receives these test telegrams at the respective opposite line end 8 or 7. If the redundancy manager receives at least one test telegram within a time interval $T_2$, the network structure is recognized as error-free. Therein, the switch 9 is either already open or it is opened again. If, within the predetermined interval $T_2$, a test telegram does not arrive at either one of the two line ends connected to the redundancy manager or if the redundancy manager 6 receives a special "error occurred" reporting telegram from one of the layer-2-components 4, the redundancy manager 6 detects an error in the network and connects the two previously separated line ends 7 and 8. That corresponds to a closing of the switch 9. Thereby, a functioning line is reestablished and communication in the network is ensured. Since this reconfiguration of the network occurs in a very short period of time, i.e., in less than a second, it is also ensured that the connected subscribers cannot interrupt any logical communication links. Thus, the communication in the network continues without disruption and an automation system, which is implemented with the network, is not affected.

If, with switch 9 closed, the redundancy manager 6 receives a test telegram at one of the two line ends 7 or 8, or if the redundancy manager receives an "error eliminated" reporting telegram, then the redundancy manager opens the switch 9 and sends a "change in network topology" telegram to all layer-2-components 4. In this way, a functioning line structure is reestablished.

It is an advantage of the present invention that the annular structure of the network is less expensive than the dual bus structure, while the fast media redundancy is maintained. The aforementioned annular structure also allows for the inclusion of subscribers with only one communication assembly. This is not possible with dual bus systems. The annular structure not only offers cost advantages regarding the structure or assembly of the network but also simplifies the hardware and software of the components used in the network. Due to the fast media redundancy, a high degree of availability of the local network is thereby achieved, while the expenditure is comparably low.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A local network, comprising:
   a line forming a line-shaped topology of the network, the line having two line ends;
   a redundancy manager, to which the two line ends are connected; and
   layer-2-switching modules,
wherein the local network has redundancy properties;
wherein the redundancy manager is configured to separate the two line ends from each other when there are no errors in the network; wherein the redundancy manager is configured to connect the two line ends with each other when there is an error in the network; wherein the redundancy manager is configured to feed, in first predetermined time intervals, at least one first test telegram into the two line ends; wherein the redundancy manager is configured to derive a first command to separate the two line ends, if the first test telegram is received at a respective other one of the two line ends within a second predetermined time interval; and wherein the redundancy manager is configured to derive a second command to connect the two line ends, if the first test telegram is not received within the second predetermined time interval.

2. The local network of claim 1, wherein the local network comprises an Ethernet network.

3. The local network of claim 1, wherein at least one of the layer-2-switching modules is configured to recognize at least one error in the network, to send a second telegram to the redundancy manager to signal the error, and to send, after elimination of the error, a third telegram to the redundancy manager to signal the elimination of the error and to signal a change of the topology of the network.

4. The local network of claim 1, wherein the redundancy manager is configured to send a second telegram to signal a change of the topology of the network, after an error in the network has been recognized and eliminated.

5. A redundancy manager for a local network, the redundancy manager being connected to two line ends of a line that forms a line-shaped topology of the network, wherein the redundancy manager is configured to separate the two line ends from each other when there are no errors in the network; wherein the redundancy manager is configured to connect the two line ends with each other when there is an error in the network, wherein the redundancy manager is configured to feed, in first predetermined time intervals, at least one first test telegram into the two line ends; wherein the redundancy manager is configured to derive a first command to separate the two line ends, if the first test telegram is received at a respective other one of the two line ends within a second predetermined time interval; and wherein the redundancy manager is configured to derive a second command to connect the two line ends, if the first test telegram is not received within the second predetermined time interval.

6. The redundancy manager of claim 5, wherein the local network comprises an Ethernet network.

7. A method for detecting and eliminating errors in a network, comprising:

in a first predetermined period of time, sending a test signal into the network via at least one of two line ends of a line of the network;

waiting for a reception of the test signal at the other one of the two line ends for a second predetermined period of time;

generating a first order to separate the two line ends from each other, if the test signal at the other one of the two line ends was received within the second predetermined period of time; and generating a second order to connect the two line ends with each other, if the test signal at the other one of the two line ends was not received within the second predetermined period of time.

8. The method of claim 7, wherein, in the sending step, the test signal is sent into the network via both of the two line ends of the line of the network.

* * * * *